US008895899B2

(12) United States Patent
Marquet

(10) Patent No.: US 8,895,899 B2
(45) Date of Patent: Nov. 25, 2014

(54) GLAZING COMPRISING A NETWORK OF CONDUCTING WIRES

(76) Inventor: Philippe Marquet, Houdeng-goegnies (BE)

(*) Notice: Subject to any disclaimer, the term of this patent is extended or adjusted under 35 U.S.C. 154(b) by 603 days.

(21) Appl. No.: 12/739,905

(22) PCT Filed: Oct. 24, 2008

(86) PCT No.: PCT/EP2008/064457
§ 371 (c)(1),
(2), (4) Date: Apr. 26, 2010

(87) PCT Pub. No.: WO2009/053469
PCT Pub. Date: Apr. 30, 2009

(65) Prior Publication Data

US 2010/0252544 A1 Oct. 7, 2010

(30) Foreign Application Priority Data

Oct. 26, 2007 (EP) .................................... 07119430

(51) Int. Cl.
*B60L 1/02* (2006.01)
*B41M 1/34* (2006.01)
*H05B 3/84* (2006.01)

(52) U.S. Cl.
CPC . *B41M 1/34* (2013.01); *H05B 3/84* (2013.01); *H05B 2203/017* (2013.01)
USPC ............................ 219/203; 156/101; 343/704

(58) Field of Classification Search
USPC ............................ 219/203; 156/101; 343/704
See application file for complete search history.

(56) References Cited

U.S. PATENT DOCUMENTS

| | | | | |
|---|---|---|---|---|
| 2,944,926 | A * | 7/1960 | Gaiser | 156/101 |
| 4,830,876 | A * | 5/1989 | Dietrich et al. | 427/108 |
| 5,182,431 | A | 1/1993 | Koontz et al. | |
| 6,075,490 | A * | 6/2000 | Sakaguchi et al. | 343/704 |
| 6,515,631 | B1 * | 2/2003 | Nakamura et al. | 343/704 |
| 8,759,717 | B2 * | 6/2014 | Chamberlain | 219/203 |
| 2004/0031146 | A1 | 2/2004 | Hahn et al. | |
| 2004/0222407 | A1 * | 11/2004 | Mears | 252/500 |
| 2006/0065435 | A1 | 3/2006 | Hahn et al. | |
| 2007/0187383 | A1 | 8/2007 | Wipfler et al. | |
| 2009/0098350 | A1 | 4/2009 | Mears | |
| 2012/0152930 | A1 * | 6/2012 | Chamberlain | 219/203 |
| 2013/0070480 | A1 * | 3/2013 | Griffin et al. | 362/612 |

FOREIGN PATENT DOCUMENTS

| | | |
|---|---|---|
| DE | 100 38 768 | 10/2001 |
| FR | 2 685 603 | 6/1993 |
| JP | 2004 221489 | 8/2004 |
| JP | 2007 102002 | 4/2007 |
| JP | 2007 200878 | 8/2007 |
| WO | 01 80608 | 10/2001 |

* cited by examiner

*Primary Examiner* — Fernando L Toledo
*Assistant Examiner* — Mohammed Shamsuzzaman
(74) *Attorney, Agent, or Firm* — Oblon, Spivak, McClelland, Maier & Neustadt, L.L.P.

(57) ABSTRACT

The invention relates to glazing units provided with conducting wires.
The glazing units according to the invention comprise enameled conducting wires applied by screen-printing. When subjected to a "zebra" test (DIN 52305), in which the conducting wires are oriented parallel to those of the image of the test and the glazing receives the incident light beam at an angle of 30° C. in relation to the normal to the glazing, the increase in distortion in relation to that of the glazing without conducting wires is at most 70% and preferably at most 50%.

8 Claims, 3 Drawing Sheets

GLAZING COMPRISING A NETWORK OF CONDUCTING WIRES

The invention relates to glazing comprising a network of conducting wires in particular intended for motor vehicles.

There are essentially two types of conducting wires, in particular heating wires, for motor vehicles glazings. The first includes the use of metal wires of very small diameter, in particular tungsten wires, which can be incorporated into the thermoplastic interlayer of laminated glazing units. The wires used, for example, in the formation of heating glazing units and windscreens in particular have extremely fine diameters so as not to impair the optics of these glazing units. The second type, which is almost universally used, corresponds to wires applied to the glazing in question in the form of a resistant enamel. Conductive enamel wires are very often exposed on the face of the glazing that is directed towards the passenger compartment and may therefore be subjected to mechanical or chemical stresses. Therefore, wires capable of resisting these stresses are required.

The printing of fine wires is intended for the formation of antennae, for example, but also and above all for the production of heating networks on the rear windows for demisting or de-icing these glazed areas. The enamel composition can be printed on the glazing using various methods, but screen-printing is by far the most widely used method.

Reference is made below to the production of glazing units comprising enameled heating networks, but the arrangements of the invention can be used in any application of enameled motifs on glazing.

The heating networks required by car manufacturers must comply with highly specific functional characteristics. They must naturally supply the power necessary to allow rapid demisting or de-icing and as uniformly as possible over the surface concerned. Equally, they must not significantly impair the optical qualities of the glazing containing them. In practice, this requirement encounters difficulties that have led to partially satisfactory compromises.

A constant requirement of the manufacturers is to ensure that the wires of these heating networks are as discrete as possible. Also, these wires must not lead to optical distortions that would disturb vision. To supply an acceptable power the technical literature discloses wires with a width in the order of 0.3 mm. However, in practice, the wires most commonly have a width of 0.5 or 0.6 mm. With these dimensions the wires are very "visible".

There are various reasons for the application of wires having these dimensions. A first reason is that the heating wires must have a resistance that allows an appropriate supply of power for the demisting or de-icing function. This power must be sufficient to allow these operations to be conducted in all circumstances within as short a time as possible. The operation in question must also cover the largest portion of the glazing and, if possible, all of it. For this last reason the heating wires are relatively long, all the more so since, for optical reasons in particular, they are generally disposed horizontally and therefore over the largest dimension of the glazing.

Moreover, the supply of electric power to motor vehicles is currently limited to voltages of 12 V for safety reasons. To reach a sufficient power, it appears necessary to keep the resistance of each of the individual wires at relatively low values. On this basis, it would seem necessary that the wires in question have an adequate cross-section for a conductivity determined by their composition.

It has also been proposed that the nature of the wires be modified to increase their conductivity. In a practical manner, the wires are essentially formed from silver pastes that provide the best rates of conductivity. The improvements in this case in particular consist of increasing the silver contents of these pastes. This method effectively allows an increase in conductivity, but the improvement is limited because the increase of this content is itself limited. The content by weight of the pastes currently used is already in the order of 80% to 85%.

The inventors have found that the application of enameled conducting wires had negative effects on the optical qualities of the glazing. Irrespective of the difficulty caused by them not being transparent, the application of enameled wires actually leads to surface modifications of the glazing. Besides silver, the screen-printing paste also contains a frit composition, the purpose of which in particular is to secure the conductive particles to the surface of the glass sheet. The formation of this enamel represents a kind of "glazed" roughness on the surface that is all the more severe since the wire formed itself has a more significant cross-section. Moreover, the fusion of the frit that attaches to the surface of the glazing causes a local discontinuity in the surface stresses applied to these toughened glazing units.

These two kinds of effects are likely to result in an impairment of the optical qualities of these glazing units. For want of anything better, these distortions are tolerated by manufacturers as far rear windows are concerned. However, there remains a constant desire to have glazing units that are devoid of such faults.

The inventors have endeavoured to obtain glazing units that essentially meet this requirement. For this, in contrast to previous practice they have not systematically sought to obtain wires of very low resistance. They have configured wires that have a much smaller width than that of the wires actually used currently. As indicated above, the current practice is to use wires with a width in the order of 0.5 to 0.7 mm. The commercially produced wires with smaller widths are not smaller than 0.3 or 0.4 mm.

In contrast, in the case of the glazing units according to the invention the wires have a width that does not exceed 0.3 mm and preferably remains below 0.2 mm. Particularly advantageously, the inventors propose widths that are in the order of 0.1 mm and can even reach 0.05 mm.

The reduction in the width of the wires with a constant quality of composition results in an increase in the electrical resistance. Where the voltage applied is also constant, an increase in resistance, with the same configuration of network, leads to a reduction in the power supplied. As a general rule, the power applied to a given glazing must remain approximately the same whatever the geometrical characteristics of the heating wire networks. Pastes with a high silver content are recommended to compensate the effect of the reduction in width of the heating wires. The structure of the conductive particles is also an element that has an influence on conductivity. However, these factors cannot be sufficient to maintain the power when the width of the wires is significantly reduced, e.g. when this width is reduced to 0.1 mm or less. In this case, the inventors propose increasing the number of wires used on a given surface, possibly by simultaneously making use of the nature of the screen-printing pastes.

Interestingly, the restriction of the width of the wires is not necessarily such that the power supplied has to remain constant. By adding further wires, the distribution of power over the surface is improved such that it is used in a more efficient manner.

The increase in the number of wider wires was not desirable previously, in particular because of the disadvantages caused by these wires to the optical quality of the glazing (surface covered by wires, but also optical distortions as indicated below). Moreover, the application of highly consistent wires raised certain problems when their width was significantly reduced.

In these conditions, the inventors have demonstrated that, even if the number of wires has to be increased to maintain adequate power, the optical quality in the presence of these heating wires can be at least as good and even appreciably better than with the previously recommended arrangements. Moreover, as indicated above, the increase in the number of wires with the same power supplied allows this power to be distributed better over the surface of the glazing. This results in a greater uniformity of temperature and a decreased risk of local overheating.

According to the invention, for the same arrangement of wires between the supply conductors, referred to as bus bars, the number of heating wires can advantageously be increased to take into consideration the variations in width of these wires. As an indication, the number of wires per unit area can be as much as double that of traditional arrangements with wires with a width of 0.6 mm. Nevertheless, the aim is to limit the number of additional wires by improving the conductivity of these wires in the best way. More often than not the number of additional wires is not increased by more than half the number in the traditional arrangements and more often than not can be a third more, or less for better conductivity rates.

For the dimensions of the wires proposed according to the invention, in particular those corresponding to widths in the order of or less than 0.1 mm, the presence of these wires becomes difficult to detect for the driver. The perceived optical improvement is therefore particularly advantageous.

The glazing units according to the invention have very reduced optical distortions compared to previous glazing units. To characterise the products according to the invention, the distortion is measured using the traditional so-called "zebra" test, disclosed in standard DIN 52305. According to this test, the image of a group of parallel lines is projected through the examined glazing onto a screen located beyond the glazing. The glazing is arranged at a certain angle in relation to the light beam. The distortion values indicated above are given for an angle of incidence of the light beam of 30° in relation to the normal to the glazing. The image is observed on the screen. The lines observed have deformations that are more or less accentuated and the extent of these is measured in a normal direction to the lines.

Thus, the invention proposes glazing units, and in particular rear heating windows, containing a network of enameled conducting wires applied by screen-printing and subsequent curing, the wires of this network being such that the variation in optical distortion presented must not be greater than 75% of that existing in the absence of these wires with the wires arranged parallel to the line images, on which the distortion is measured. Advantageously, this optical distortion is not greater than 50%, and particularly advantageously 30%, of that found for the glass sheet alone. The best results allow the optical distortion to not be increased by more than 15% in relation to the sheet alone.

In the case of the invention, the test is conducted before application of the conducting wires and after this application to determine the variation in distortion. The relation of these measurements represents modifications associated with the presence of the wires.

The conditions for application using screen-printing are precisely chosen to obtain the glazing units according to the invention. The first consideration is the quality of the screen-printing screen used. It is also important to adapt the paste used to form the conductive enamel to be the best possible.

The characteristic elements that control the performance of screens are in particular the fineness of the wires that form these and the mesh of these screens. However, the inventors also considered that the precision of the coating of the screen that determines the zones that retain the printed compositions and those that allow these compositions to pass through is also decisive.

Moreover, the screen is further characterised by the manner of contact with the glass sheet. The glass sheet provides a very smooth surface. To both allow a precise coating and avoid excessive adherence of the screen, the condition of the surface in contact with the glass must have a certain roughness: if too severe the design remains inadequately precise, if too light the screen will not adequately adhere.

In the traditional methods the formation of the image on the screen is achieved by coating using a photosensitive emulsion. The selective exposure of the fabric coated by the emulsion causes fixture of this emulsion. The emulsion is then removed from the non-exposed parts by washing.

The coating and image-forming operations are traditionally conducted by the user. Close study of the coating conditions has revealed the importance of this operation to the quality of the printed motifs. The difficulty is then to properly control the coating parameters in order to guarantee quality and reproducibility.

Preparation in a perfectly controlled manner allows a high uniformity of coating and an improved surface evenness, and these ultimately result in a motif that is likewise more even.

The coated fabric naturally has a certain roughness. This roughness can be controlled by the coating itself by smoothing the coated surface to some extent. This smoothing is difficult to achieve by individual means such as those used when the users themselves perform this coating process. Screen manufacturers are now proposing fabrics that have been pre-coated in conditions that greatly improve the characteristics in question.

To obtain the results required for the intended applications, according to the invention the roughness of the coated screen must amount to 2 to 10μ, preferably 3 to 8μ and particularly preferred 4 to 7μ.

Irrespective of the roughness exhibited by the screen bearing the emulsion, the thickness of the emulsion layer must also be as even as possible over all the zones of the screen that are permeable to the printed compositions. The variations in thickness over the surfaces in question must not exceed 2μ and advantageously not exceed 1μ.

Where the fabrics of the screen-printing screens have a very even thickness, the variations in thickness measured on the coated fabric are almost exclusively due to the quantity of emulsion retained by the screen. The evenness of the thickness of emulsion retained by the fabric guarantees a well controlled passage through all the meshes of the screen.

To guarantee a uniform thickness of the emulsion, it is also preferable to maintain the quantity deposited on the fibres so that it is sufficient for the formation of a very plane surface within the roughness ranges indicated above. While the emulsion must coat all the fibres and also assist in providing resistance to wear caused by the friction of the scraper blade, it is also preferable to limit this thickness to assure the precision of the motifs formed, since too great a thickness may lead to less sharp exposure and therefore to contours that are likewise less well-defined.

In practice, the thickness of the coated fabric is not greater than 10% of that of the fabric before coating and preferably not greater than 7%.

All these variations are particularly small especially in the case of large screen dimensions that represent the most usual applications according to the invention. The glazing units in question generally have an area of at least 0.3 $m^2$ and most often at least 0.5 $m^2$. They can reach dimensions in the order of 3 $m^2$, but most often do not exceed 2.5 $m^2$ and in the most usual cases have an area that does not exceed 2 $m^2$.

The precision of the printed motifs is clearly dependent on the mesh of the fabric of the screen-printing screen. The smaller the mesh, the better the definition of the design becomes. However, various elements restrict the decrease in size of the mesh. A first factor is the nature of the printed composition, in particular of compositions intended to form enameled motifs. Such compositions comprise a dispersion of particles of a material forming a frit in a liquid medium. The choice of meshes must take into consideration the viscosity of the composition applied: the finer the mesh, the more fluid the composition must be. However, the viscosity of the composition is also dependent on the nature of the composition and the mode of application. In other words, variations in viscosity are necessarily limited.

More or less viscous compositions provide variable surface tension properties which benefit the "smoothing" of the applied motifs to a greater or lesser extent. In other words, the choice of composition allows the printing points to be converted into an even, continuous motif reasonably easily.

The increase in fluidity of the composition can be necessary to take into consideration a reduction in the mesh dimensions, but a certain viscosity must be maintained so that the composition remains precisely at the placement of the printing. In the case of a composition that is too fluid, the capillary and surface tension mechanisms no longer allow a sufficiently precise control of the contour of the motifs. Undesirable spots and parting lines can occur. On the other hand, a composition that is very fluid is necessarily low in particles in suspension. The quantity of enamel deposited is therefore reduced accordingly.

In practice, the compositions have a viscosity of 5000 to 65000 cPs, more often between 8000 and 45000 cPs and advantageously from 10000 to 35000 cPs. This viscosity corresponds to the composition as applied. This is generally obtained from commercially available compositions by adding a solvent that causes fluidisation of these base products. In other words, the commercially available compositions used generally have a viscosity greater than those of the compositions actually applied.

Moreover, a reduction in the mesh dimensions requires the use of increasingly fine wires. The rigidity of the fabric of the screen cannot be perfectly maintained in the case of very fine wires. The stability of the screen-printed motifs partially depends on this rigidity. It is obviously necessary that the fabric does not become distended under the stresses of application of the compositions, as this would cause deformation of the motifs, which is contrary to the intended aim. This resistance to deformation of the screen must be all the greater when this screen has larger dimensions. Therefore, it is advantageous to choose the nature of the wires so that they have a limited elasticity.

Wires of small diameter are a necessary requirement to obtain fine meshing, but it is not possible to reduce the cross-section of wires indefinitely. In the suitable materials advantageous dimensions for the wires are 15 to 70 μm in diameter, preferably 20 to 60 μm and particularly preferred 25 to 50 μm.

Working from very fine wires, the number thereof per centimeter is also determined. According to the invention, it is advantageous to use screens such that the number of wires in warp and weft lies in the range of between 50 and 200 wires per centimeter, preferably between 80 and 160 and particularly preferred between 90 and 150 wires per centimeter.

Dimensions of the apertures of the mesh also correspond to these dimensions and number of wires. They are all the more significant when the wires have a more significant diameter and are consequently in smaller numbers per centimeter. This resolution as indicated above is limited by that of the diameter of the wires. Moreover, the reduction in size of the apertures is also limited by the dimension of the particles of the screen-printed compositions.

In practice, the mesh apertures in the applications according to the invention advantageously lie between 200 and 30 μm in width and preferably between 100 and 40 μm.

To enable easy application, the dimensions of the particles of the compositions used must remain compatible with the mesh apertures. The particles preferably have dimensions that are less than ⅔ of the mesh apertures and preferably at most equal to half these apertures.

With these characteristics it is possible to obtain substantially improved resolutions compared to those obtained previously. An appropriate selection of the characteristics as regards the screen and the composition applied enables a resolution in the order of about ten micrometers to be obtained. In other words, with the available means that can be readily used in the conditions of large-scale industrial production, it is possible to produce very even screen-printed wires with a width in the order of 10 μm and even as low as about 5μ. These dimensions allow these wires to be applied on glazing units of different types: heating rear windows, side glazing units, roofs, but also glazing units previously unable to accommodate these wires that were considered aesthetically unacceptable because of the large widths obtained in previous techniques, in particular windscreens.

The invention will be described below with reference to the sets of drawings, wherein:

FIG. 1 is a schematic view of a fabric as used for screen-printing applications;

FIG. 2 schematically shows the arrangement of the wires forming the fabric of FIG. 1;

Figure 1:
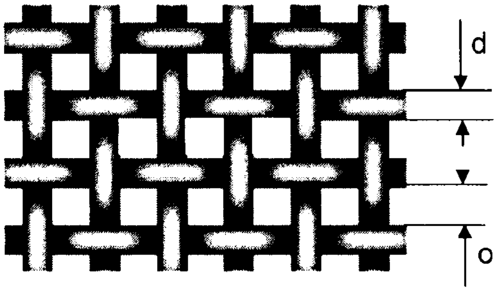

FIG. 1 shows an example of fabric that can be used for the screen-printing application. The fabric shows warp 1 and weft 2 wires of the same dimensions evenly intersecting one another. The mesh apertures o are usually in the order of magnitude of the diameter d of the wires of the fabric. The apertures are square in the representation.

The fabrics have different characteristics, depending on the applications, e.g. different warp and weft wires, variable meshes according to the zones of the screen etc.

Figure 2:

FIG. 2 is a sectional view of the arrangement of the wires 1, 2 in the fabric. This figure shows in particular the configuration of the surface of the fabric of the screen in an magnified manner. Clearly the surface at the level of the wires is not plane but moulds to the undulations of the wires. The surface configuration takes into account the dimensions of the wires, of the mesh as well as the tension of the fabric.

Figure 3:
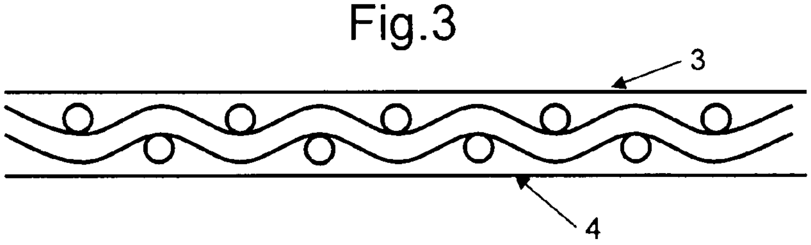
FIG. 3 is similar to the preceding figure with the fabric covered by photosensitive coating.

FIG. 3 shows the fabric covered by the photosensitive coating 3. The even coating impregnates the whole of the fabric such that in particular the lower face 4 in contact with the substrate to be printed is substantially plane at least at the level of the meshes.

Figure 4:
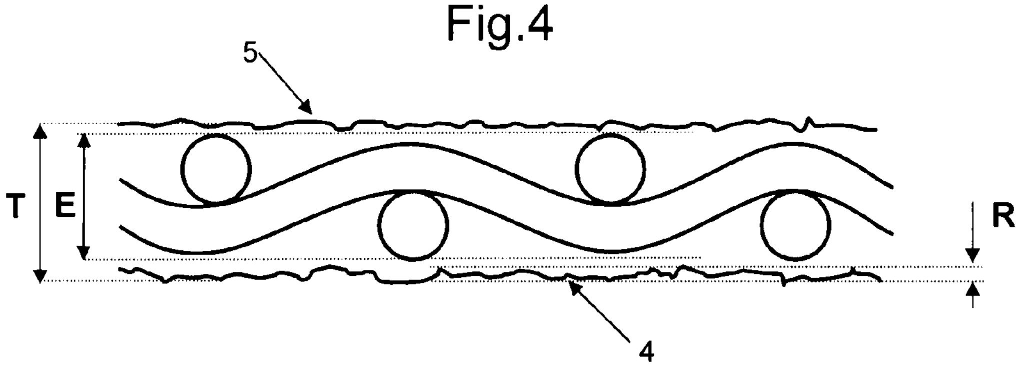
FIG. 4 is a view similar to the preceding one on an enlarged scale.

FIG. 4 schematically illustrates the actual state of the coated surface on a larger scale than that of FIG. 3.

The thickness T of the fabric with the photosensitive coating is greater than that of the fabric alone E. This additional thickness is possibly located on the upper face 5 of the fabric, but principally on the lower face 4. The two faces on this scale show irregularities that determine what is termed roughness.

In FIG. 4 the roughness is measured between the prominent points and those at the deepest point in the hollows of this surface. These irregularities or rough areas are given the reference R in the figure.

The surface roughness of the screen-printing screen in particular prevents the application of the composition from causing excessive adhesion of the screen to the printed substrate by surface action mechanisms. These irregularities break the continuity of the coated layer without leading to defects in the covering of the printed surfaces.

The pre-coated screens can be produced on various fabrics. In particular, it is possible to choose homogeneous fabrics, in which the meshing is constant over the entire surface. It is also possible to use a "vario" fabric. In these fabrics some zones have larger mesh apertures. This type of fabric is useful, for example, in the case of rear windows to simultaneously form the wires and bus bars that supply them with power. The bus bars must have a very low resistance so as not to unnecessarily heat the zones of the glazing that are not in the zones of vision. To achieve this, it is desirable to deposit a larger quantity of composition per unit area than that of the heating wires. The use of "vario" screens meets this requirement.

Figure 5:
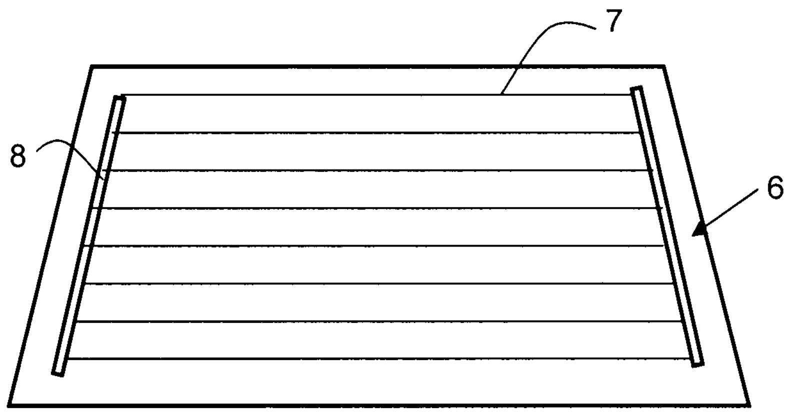
FIG. 5 illustrates the application according to the invention for the production of heating glazing units.

As an indication, a network of heating wires is applied to a glazing intended to form a rear window of a motor vehicle 6, as shown in FIG. 5. The heating wires 7 are applied by screen-printing using a silver-based conductive paste available from Ferro. The silver-based pastes are in particular those sold under the references SP 1950, SP 1951. They contain variable proportions of silver. The respective contents of these compositions amount to 88% and 69% by weight. Pastes with a still higher silver content are, for example, SP 1965 and SP 1972 also produced by Ferro. The silver content by weight of these pastes is 90% and 92% respectively.

These variable contents enable the resistance of the wires to be varied and the power supplied to the glazing to be adjusted with constant wire widths. The conductive pastes in question are applied in such a quantity that for a thickness of 8 μm the resistivity of the conducting wires is at most equal to 3.5 Ω·□ after curing and preferably at most equal to 3 Ω·□.

The compositions are adjusted in viscosity to a value in the order of 20000 cPs.

The fabrics pre-coated with photosensitive composition, such as those available from Sefar, used in the example are formed from polyester wires with a diameter of 25 μm. The number of wires per centimeter amounts to 120 in warp and weft. The mesh aperture amounts to about 70 μm.

The coated fabric is exposed to fix the coating except for the zones corresponding to the design of the heating wires 7 and bus bars 8. After removal of the coating in the non-exposed zones the screen is ready for use.

The surface roughness of the lower face of the screen is about 4 μm. The thickness of the fabric is in the order of 50 μm and the additional thickness due to the coating is in the order of 3 μm. Therefore, the layer covers the wires over a relatively small thickness. Nevertheless, this very even layer that strongly adheres to the wires is satisfactorily resistant to wear during use.

The paste is applied in the traditional manner.

After thermal treatment, the printed wires form a conductive enamel.

Depending on the characteristics, in particular of the screen, the resolution obtained is in the order of 0.05 mm in this case. Previously, very fine wires obtained by screen-printing had a markedly less satisfactory resolution.

The choice of such small dimensions in turn requires especially conductive composition if the objective is to maintain the resistances in the usual limits. It is preferable in this case to choose compositions with a very high silver content such as those mentioned above. This is all the more necessary since application of the composition for wires with a very small width is very often accompanied by a simultaneous reduction in thickness of the printed wires, which also results in an increase in resistance.

The conduction characteristics of the heating wires follow a course that is much more than proportional to the content of conductive particles. In other words, a relatively modest increase in the content of conductive particles is accompanied by a very significant increase in conductivity. By way of example, changing from a content of 70% to a content of 85% of conductive particles can result in an increase in conductivity of 50% or more of the wires produced with otherwise the same characteristics. It is therefore possible to maintain a usable resistance even with very fine heating wires.

Conversely and for the reasons outlined above, the use of extremely thin wires, despite an increase in resistance, can lead to interesting properties, all the more so since these properties are not impeded by a possible increase in the number of wires used in the aim of maintaining the same power dissipated per unit area under an identical maintained voltage.

Going from a network of heating wires in which the width of the wires is 0.3 mm to wires with a width of 0.1 mm, it is thus possible to develop an equally efficient power dissipated per unit area by replacing a network of 17 wires arranged evenly over the glazing of the heating window by a network comprising 21 finer wires. The improvement in distribution of the power over the glazing because of the additional number of wires allows an identical effect, with a slightly lower power (10-15%), with respect to the de-icing measured by the time required to obtain a standardised operation by the car manufacturers.

Figure 6:
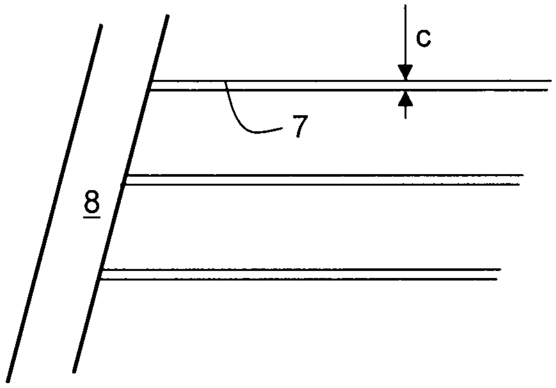
FIG. 6 shows a detail of the glazing of FIG. 5 on an enlarged scale.

A clear advantage in the field of glazing units having heating conducting wires when the arrangements according to the invention are used is the discrete nature of the wires. The transverse dimension c of these heating wires 7, as indicated in FIG. 6, is sufficiently low to allow these wires to even be placed in the zones where traditional wires are considered too large. This is the case in particular with windscreens. The more traditional applications like that of heating networks for rear windows are also advantageously achieved in the conditions of the invention.

For the same available power, the presence of heating wires obscure a part of the surface of the glazing that is much smaller since the wires are narrower. In the case of 0.5 mm wires the area covered represents 1.6% of the whole. In the case of 0.3 mm wires the area covered is not more than about 1% of the total area and is only 0.33% for wires with a width of 0.1 mm. According to the invention, therefore, the area covered by the wires preferably does not cover more than 1% of the surface of the glazing containing the network of wires in question.

The choice of fine wires for the glazing units according to the invention additionally allows an appreciable improvement in the optical qualities of the glazing units, even when the number of wires is increased.

Figure 7:
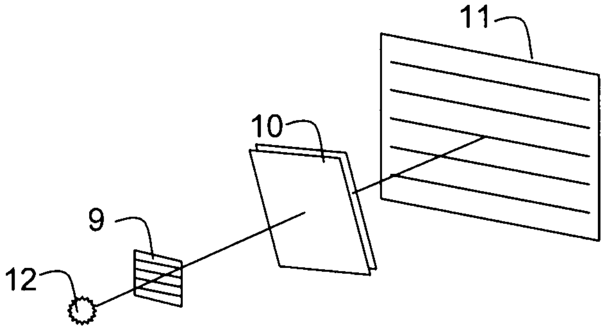
FIG. 7 is a schematic representation of the device for measuring optical distortion.
Figure 8:
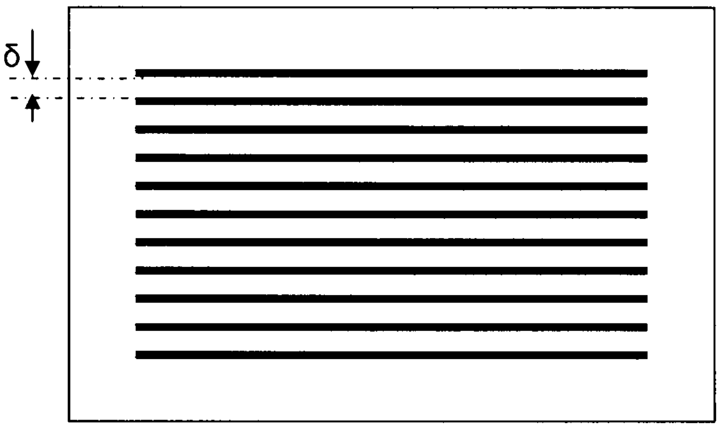
FIG. 8 represents the measurement conducted on the projected image in the determination of the optical distortion.
Figure 9:
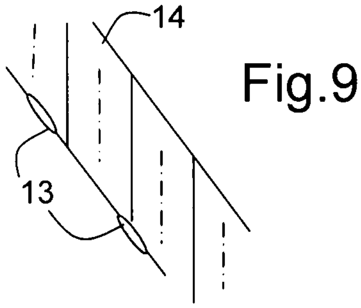
FIG. 9 is a schematic view in section of a glazing having lines of enameled conductors.

Measurement of the optical quality is traditionally conducted in the automotive industry, and in particular using the so-called "zebra" method, which is illustrated in FIGS. 7 and 8.

The principle of the distortion measurement technique consists of projecting the image of a group of parallel lines arranged on a transparency 9. The light beam emitted from the source 12 passes through the transparency, through the glazing 10 and reproduces the image on the screen 11. The lines projected onto the screen are all equidistant when the glazing is completely devoid of optical faults. Conversely, the deviations δ show deviations in relation to the normal distance when the glazing has surface irregularities.

The presence of conducting wires 13 on the surface of the sheet 14 systematically leads to deformations that are all the more significant when the conducting wires are themselves larger. According to the invention it was stated above that the reduction in width is often accompanied by a simultaneous reduction in their thickness.

While the traditional wires with a width of 0.6 mm usually have thicknesses in the order of 10 to 12μ, the narrower wires according to the invention have much smaller thicknesses because of the necessity of using screen-printing screens with smaller apertures and, if necessary, using a composition that is less viscous and therefore has a lower content of solid materials. Wire thicknesses obtained in these conditions amount to between 4 and 9μ, for example.

The reduction in the dimensions of the wires on the surface of the glass sheet is certainly accompanied by a reduction in optical defects. The reason for this reduction probably lies in the fact that the formation of the enamel corresponding to these wires, which in some way partially fuses with the glass sheet, modifies the local stresses that are likely to take part in the formation of distortions. By reducing the quantity of enamel for each wire, the resulting modifications to the surface of the sheet are also reduced and therefore also the distortions resulting therefrom.

In all cases, the deviations in the optical distortions determined by the zebra test are much smaller when the wires obtained are finer.

As an indication, the deviations on the screen were measured in a series of tests for different sheets comprising conducting wires of variable widths. The deviation values are those located in the central region of the image to avoid parallax errors. They also clearly depend on the respective arrangements with respect to the original image, on the position of the glass sheet and that of the screen.

In these tests the glass sheet is inclined in relation to the axis of the beam to reproduce a configuration that is representative of that determined for the rear windows of many motor vehicles. This inclination is such that the normal to the sheet forms an angle of 30° in relation to the direction of the beam. In the selected configuration the enameled wires are arranged parallel to the projected lines.

The deviations measured in millimeters on the screen for the distances between the lines are shown in the following table. In the case of the blank glazing, the position is the same as for glazing units with the wires.

| Reference | 0.1 mm wires | 0.3 mm wires |
|---|---|---|
| 1.32 | 1.59 | 4.36 |

The deviation in distance measured for a glazing comprising 0.3 mm wide wires is three times that of the glazing without wires. In the test the same measurement conducted on a glazing comprising 0.1 mm wide wires indicates an increase in distortions that is only 20% greater than the distortion in glazing without wires.

The improvement in optical properties substantially exceeds that which could be expected. This result allows wires of this nature to be used in glazing units that until now could not receive these screen-printed elements because of defects caused in the previous conditions.

The reduction in the dimensions of the wires must not have a negative effect on durability. Car manufacturers require that the products complete various tests. This concerns in particular resistance in an acid medium (2 hours in contact with a 0.1 N sulphuric acid solution at 23° C.), in a basic medium (2 hours in contact with a 1 N soda solution at 23° C.) and in a hydrogen sulphide atmosphere (24 hours at 50° C.).

The trials conducted on the products with the dimensions according to the invention (0.1 mm in width) successfully passed all the tests. The reduction in the dimensions of the wires, even with a reduced frit content, did not adversely affect their resistance to the prescribed conditions for the considered use overall.

The requirements relating to the heating wires of rear windows are more difficult to meet than those associated with other uses. This is the case in particular with antennae, for which the question of electrical resistance is only a secondary consideration in the choice of wire thickness. The implementation of the conditions of the invention is therefore equally advantageous for these other applications.

The invention claimed is:

1. A glazing comprising, a plurality of enameled conducting wires having a width at most equal to 0.1 mm, wherein in a "zebra" test in which the enameled conducting wires are oriented parallel to those of an image of the "zebra" test and the glazing receives an incident light beam at an angle of 30° in relation to the normal to the glazing, the increase in distortion is at most 70% of that existing in the absence of the enameled conducting wires with the wires arranged parallel to those of the image, wherein the enameled conducting wires have a resistivity at most equal to 3.5Ω□, and wherein each conducting wire is obtained by a process comprising depositing a photosensitive emulsion in the form of a wire on a substrate of the glazing through a wire mesh of an applicator that deposits said photosensitive composition and thermally treating said photosensitive composition to form each wire, said wire mesh comprising from 50 to 200 wires per centimeter, each wire having a diameter of from 15 to 70 μm, and a surface roughness on a face directed towards a substrate of from 2 to 10 μm.

2. The glazing according to claim 1, wherein the increase in distortion in relation to that of the glazing without the enameled conducting wires is at most 30%.

3. The glazing according to claim 1, wherein the enameled conducting wires have a thickness in the range of from 4 to 9 μm.

4. A heating window comprising the glazing according to claim 1, comprising an assembly of heating wires, in which an area of the enameled conducting wires covers not greater than 1% of a surface area of the glazing comprising the assembly of heating wires.

5. The glazing according to claim 1, wherein the enameled conducting wires have a width between 0.1 mm and 0.05 mm.

6. The glazing according to claim 2, wherein the enameled conducting wires have a thickness in the range of from 4 to 9 μm.

7. The glazing according to claim 1, wherein the increase in distortion in relation to that of the glazing without the enameled conducting wires is at most 50%.

8. The glazing according to claim 5, wherein the increase in distortion in relation to that of the glazing without the enameled conducting wires is at most 30%.

* * * * *